United States Patent [19]
Sue et al.

[11] Patent Number: 5,569,709
[45] Date of Patent: Oct. 29, 1996

[54] GRAFTING, PHASE-INVERSION AND CROSS-LINKING CONTROLLED MULTI-STAGE BULK PROCESS FOR MAKING ABS GRAFT COPOLYMERS

[75] Inventors: Chen-Youn Sue, Williamstown; Robert Koch, Parkersburg; John E. Pace, Washington; Gregory R. Prince, Sandyville, all of W. Va.

[73] Assignee: General Electric Company, Pittsfiled, Mass.

[21] Appl. No.: 364,862

[22] Filed: Dec. 27, 1994

Related U.S. Application Data

[62] Division of Ser. No. 165,766, Dec. 10, 1993, Pat. No. 5,414,045.

[51] Int. Cl.$^6$ ............................................. C08L 51/04
[52] U.S. Cl. .................... 525/52; 525/53; 525/86; 525/316
[58] Field of Search ................ 525/86, 316, 314, 525/52, 53

[56] References Cited

U.S. PATENT DOCUMENTS

| | | |
|---|---|---|
| 2,646,418 | 7/1953 | Lang . |
| 2,694,692 | 11/1954 | Amos et al. . |
| 2,727,884 | 12/1955 | McDonald et al. . |
| 3,243,481 | 3/1966 | Ruffing et al. . |
| 3,509,237 | 4/1970 | Aubrey . |
| 3,511,895 | 5/1970 | Kydocleus et al. . |
| 3,660,535 | 5/1972 | Finch et al. . |
| 4,141,933 | 2/1979 | Bracke . |
| 4,187,260 | 2/1980 | Kruse et al. . |
| 4,212,789 | 7/1980 | Anspon . |
| 4,221,883 | 9/1980 | Mott et al. . |
| 4,239,863 | 12/1980 | Bredeweg . |
| 4,252,911 | 2/1981 | Simon . |
| 4,254,236 | 3/1981 | Burk . |
| 4,277,574 | 7/1981 | Jastrzebski et al. . |
| 4,298,716 | 11/1981 | Dufour . |
| 4,315,083 | 2/1982 | Burk . |
| 4,387,179 | 6/1983 | Sun . |
| 4,417,030 | 11/1983 | Aliberti et al. . |
| 4,451,612 | 5/1984 | Wang et al. . |
| 4,612,348 | 9/1986 | Sun . |
| 4,640,959 | 2/1987 | Alle . |
| 4,713,420 | 12/1987 | Henton . |
| 4,785,051 | 11/1988 | Henton . |
| 4,874,815 | 10/1989 | Bubeck et al. . |
| 5,278,253 | 1/1994 | Baumgartner et al. . |
| 5,349,012 | 9/1994 | Fujita . |
| 5,387,650 | 2/1995 | Baumgartner ........................... 525/316 |

FOREIGN PATENT DOCUMENTS

| | | |
|---|---|---|
| 0376232 | 4/1990 | European Pat. Off. . |
| 0477764 | 4/1992 | European Pat. Off. . |

*Primary Examiner*—Vasu S. Jagannathan

[57] ABSTRACT

A method is provided for continuous mass polymerization of acrylonitrile-butadiene-styrene type thermoplastics. The method involves charging a liquid feed comprising a vinylidene aromatic monomer, an unsaturated vinyl nitrile monomer and a synthetic butadiene polymer dissolved therein into a grafting reactor to prereact the liquid mass to form grafted rubber continuous phase polymeric product. The product from the grafting reactor is then charged to a phase inversion reactor where free rigid copolymer in monomer is the only continuous phase, and where dispersed particles of grafted rubber with occluded rigid copolymer and monomer are immediately formed from the product of the grafting reactor. The second polymerization product, which is coming out from the phase inversion reactor, is then charged to a finishing reactor wherein the material is further polymerized to form a third polymerization product which then can be devolatilized to provide a final thermoplastic composition. The process of the present invention provides unique capacity and flexibility in controlling and adjusting rubber grafting and rubber particle morphology. Process conditions can be controlled to produce a high gloss or a low gloss resin product.

20 Claims, 1 Drawing Sheet

GRAFTING, PHASE-INVERSION AND CROSS-LINKING CONTROLLED MULTI-STAGE BULK PROCESS FOR MAKING ABS GRAFT COPOLYMERS

This is a divisional of application Ser. No. 08/165,766 filed on Dec. 10, 1993 U.S. Pat. No. 5,414,045.

BACKGROUND OF THE INVENTION

1. Field of the Invention

This invention relates to methods for making rubber reinforced copolymers, and more particularly relates to methods for making rubber modified graft copolymers of monovinylidene aromatic monomers and unsaturated nitrile monomers grafted on a rubbery substrate by mass polymerization.

2. Description of the Related Art

Rubber modified graft copolymers of a monovinylidene aromatic such as styrene and an unsaturated nitrile such as acrylonitrile having particulates of rubber, generally an alkadiene rubber, dispersed throughout a copolymeric matrix (conventionally referred to as ABS resins) are employed in a wide variety of commercial applications such as packaging, refrigerator linings, automotive parts, furniture, domestic appliances and toys. It is well known that the physical properties of an ABS resin such as toughness (i.e., the combination of elongation and impact strength), at both room and lower temperatures, are affected by the grafted styrene-acrylonitrile copolymers of the rubber substrates and by the size, composition and morphology of the dispersed rubber particles and/or the concentration of the rubber substrates in the rubber-reinforced copolymers. For example, to achieve the balance of physical properties required in many applications, the rubber particles are necessarily dispersed through the copolymer matrix at a relative size of typically 0.5 microns and 5 microns, typically yielding a low gloss product as a result of the rubber sizes being at least 0.4 microns as the average particle size, more typically greater than 0.5 microns.

There are two well known manufacturing processes among many different bulk (mass) ABS processes. The first one is a multi-zone, continuous plug flow process. The second is a bulk/suspension process. The multi-zone plug flow bulk HIPS/ABS process was described in early U.S. Pat. Nos. 2,646,418; 2,694,692; 2,727,884 and 3,243,481 and in many other patents that followed, such as U.S. Pat. Nos. 4,874,815; 4,785,051; 4,713,420; 4,640,959; 4,612,348; 4,387,179; 4,315,083; 4,254,236; 4,417,030; 4,277,574; 4,252,911; 4,239,863; 4,221,883; 4,187,260; 3,660,535; 3,243,481—all of which are incorporated herein by reference.

Multizone plug flow bulk processes include a series of polymerization vessels (or towers), consecutively connected to each other, providing multiple reaction zones. Butadiene (BD) rubber (stereospecific) is dissolved in styrene (ST) or in styrene/acrylonitrile (ST/AN), and the rubber solution is then fed into the reaction system. The polymerization can be thermally or chemically initiated, and viscosity of the reaction mixture will gradually increase. During the reaction course, the rubber will be grafted with ST/AN polymer (grafted SAN) and, in the rubber solution, bulk SAN (referred to also as free SAN or matrix SAN or non-grafted SAN) is also being formed. At a point where the free SAN (i.e. non-grafted SAN) can not be "held" in one single, continuous "phase" of rubber solution, it begins to form domains of SAN phase. The polymerization mixture now is a two-phase system. As polymerization proceeds, more and more free SAN is formed, and the rubber phase starts to disperse itself as particles (rubber domains) in the matrix of the ever-growing free SAN. Eventually, the free SAN becomes a continuous phase. This is actually a formation of an oil-in-oil emulsion system. Some matrix SAN is occluded inside the rubber particles as well. This stage is usually given a name of phase inversion. Pre-phase inversion means that the rubber is a continuous phase and that no rubber particles are formed, and post phase inversion means that substantially all of the rubber phase has converted to rubber particles and there is a continuous SAN phase. Following the phase inversion, more matrix SAN (free SAN) is formed and, possibly, the rubber particles gain more grafted SAN. When a desirable monomer conversion level and a matrix SAN of desired molecular weight distribution is obtained, the reaction mixture is "cooked" at a higher temperature than that of previous polymerization. Finally, bulk ABS pellets are obtained from a pelletizer, after devolatilization where volatile residuals are removed.

For the mass/suspension process, U.S. Pat. Nos. 3,509,237; 4,141,933; 4,212,789; 4,298,716, describe those processes. A monomer solution of rubber substrate is charged to a reactor, and polymerization is carried out to reach a given solids level where phase inversion occurs. After phase inversion, the polymerization mixture is transferred to a reactor and mixed with water/suspending agent/surface-active agent. Polymerization is then completed in this suspension system.

Furthermore, U.S. Pat. No. 3,511,895 describes a continuous bulk ABS process that provides controllable molecular weight distribution and microgel particle size using a "three-stage" reactor system, for extrusion grade ABS polymers. In the first reactor, the rubber solution is charged into the reaction mixture under high agitation to precipitate discrete rubber particle uniformly throughout the reactor mass before appreciable cross-linking can occur. Solids levels of the first, the second, and the third reactor are carefully controlled so that molecular weights fall into a desirable range.

Continuous mass polymerization processes employing continuous-stirred tank reactors have been employed in the production of high impact modified polystyrene wherein for example a process involving three reaction steps wherein the first step is a continuous-stirred tank reactor, the second step is a continuous-stirred tank reactor, and the third step is a plug-flow reactor.

In such a system, the first continuous-stirred tank reactor would be charged with styrene monomer having polybutadiene polymer dissolved therein, wherein the styrene monomer and polybutadiene polymer would be reacted sufficiently until phase inversion, at which point discrete particles of rubbery phase would separate from a second phase of polystyrene and styrene monomer, this phase inverted product would then be charged to a second continuous-stirred tank reactor wherein further monomer conversion takes place, followed by reaction of product from the second continuous-stirred tank reactor in a plug-flow type reactor to obtain final conversion. There is a desire to employ continuous-stirred tank reactors, due to their superior ability to control temperature and heat transfer in the reactor, in the mass polymerization of ABS type graft copolymers. However, applicant has discovered that using a first step involving a continuous-stirred tank reactor wherein phase inversion occurs does not yield uniform grafting of the rubber and results in an undesired precipitation of rubber particles before high levels of grafting onto the rubber are achieved. Inadequate grafting leads to poor product performance including reduced levels of impact strength.

Furthermore, different processes of ABS manufacturing give different properties to the final ABS products. One of these properties is the surface gloss of the end products, and technology development to produce ABS materials that could meet with different gloss requirements is still an on-going task for the ABS industry.

The gloss of an ABS product is partially the result of molding conditions under which the product is manufactured. However, for a given molding condition, the rubber particle size (diameter) of the ABS material is a major contributing factor to the gloss. In general but not always, ABS materials from emulsion processes produce rubber particles of small sizes (from about 0.05 to about 0.3 microns). Therefore, high gloss products are often made from emulsion ABS materials. On the other hand, ABS materials from mass processes usually form rubber particles of large sizes (from about 0.5 to 5 microns). Therefore, low gloss products are often made using the bulk ABS materials. Although it is possible to produce small particles using bulk processes, the gloss and impact resistance balance will be difficult to reach.

In order to combine advantages offered by emulsion and bulk ABS materials for better gloss and impact balances, these two type of ABS materials are blended at different ratios to obtain bimodal particle size distributions. For example, U.S. Pat. Nos. 3,509,237 and 4,713,420 presented technology of this type so that high surface gloss and good impact strength were achieved.

Also, ABS materials of bimodal particle size distributions that gave gloss readings from 80 to 99 percent were directly made from a bulk process, described in U.S. Pat. No. 4,254,236. To make this type of bulk ABS, two feed streams were simultaneously charged to the reaction system. One of the feed streams was a mixture containing rubber substrate, monomers and a superstrate (matrix polymer) of the monomers. The other was a monomer solution of the rubber substrate. Another U.S. Pat. No. 3,511,895 described a bulk process where rubber particles are formed by dispersing and precipitating polymeric butadiene rubber as discrete droplets in the reaction mixture, leading to bulk ABS of high gloss. With such process conditions, the desirable "cell" morphology of rubber particles could hardly be obtained, resulting in low impact strength. Another U.S. Pat. No. 4,421,895 described a continuous process for relatively small sizes (averages were 0.5 to 0.7 microns) of rubber particles for bulk ABS. However, those average particle sizes are not uncommon for bulk ABS materials and are still hoe small enough to contribute to the high gloss performance. However, efforts have been made to produce smaller sizes of rubber particles in bulk processes using a particle disperser after phase inversion, described in EP 0 376 232 A2. The average particle sizes were able to be reduced to a volume average diameter of 0.4 microns. But, the respective gloss value was 89%, that was only at the high end of the regular bulk ABS "reduced/lower" gloss range.

Overall, current technology described above has not been able to produce, by a bulk process alone, ABS materials of rubber particles of "cell" morphology with monomodal particle size distributions and with average particle sizes less than 0.3 microns of number average diameter, without compromising impact resistance properties.

To synthesize ABS polymers with high performance by bulk processes, three aspects are essential among many others. These three aspects are grafting of the rubber substrate prior to phase inversion, particle formation during phase inversion, and cross-linking of the rubber particle at the completion point of the bulk ABS polymerization. However, the above mentioned bulk ABS processes are somehow deficient by different degrees in controlling and in adjusting the grafting, the phase inversion, and the cross- linking. Accordingly, there is a desire to provide a continuous mass polymerization process which yields the desired rubber morphology and maximizes grafting thereby allowing a minimization of rubber use for a given level of property performance. Additionally, there is a desire to provide a bulk process capable for producing ABS resins of low gloss as well as high gloss.

SUMMARY OF THE INVENTION

The present invention provides a multistage bulk process which involves reacting in a plug flow grafting reactor a liquid feed composition comprising vinylidene aromatic monomer, unsaturated nitrile monomer and rubbery synthetic butadiene polymer to a point prior to phase inversion, reacting the first polymerization product therefrom in a continuous-stirred tank reactor to yield a phase inverted second polymerization product which then can be further reacted in a finishing reactor, and then devolatilized to produce the desired final product. The process permits the formation of high gloss bulk products having a rubber morphology which is celluar and which permits the combined properties of high gloss and high impact strength.

DETAILED DESCRIPTION OF THE INVENTION

Figure 1:
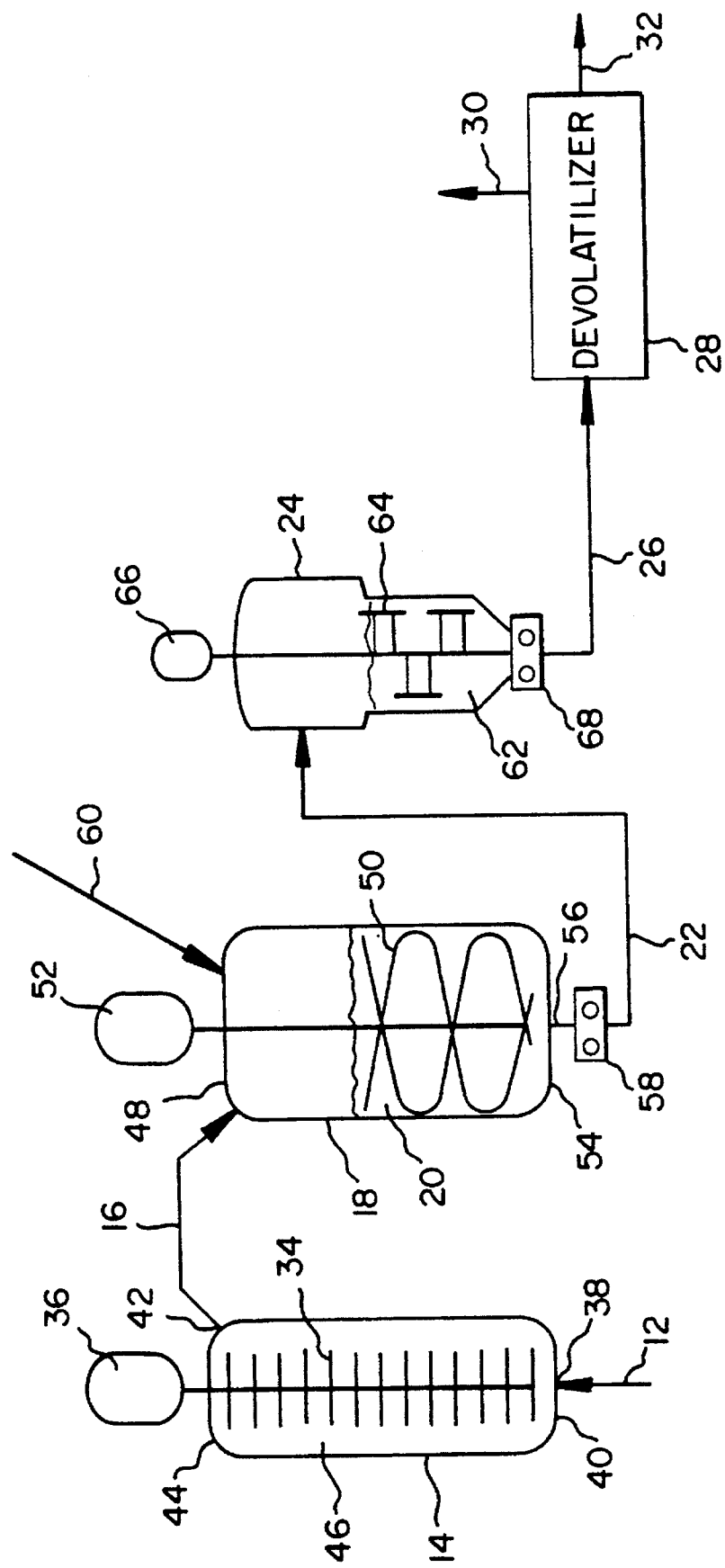
FIG. 1 is a schematic drawing of a process according to the present invention including a plug flow grafting reactor, a continuous stirred tank phase inversion reactor, a boiling type plug flow finishing reactor and a devolatilizer.

Theoretically, rubber phase inversion starts to occur when the bulk polymerization solution reaches a point at which the free SAN phase volume is equal to the grafted rubber phase volume (the equal phase volume point). At this point, the formation of a continuous free SAN phase (or the disappearance of a dispersed free SAN phase) and the formation of a dispersed grafted rubber phase (or the disappearance of a continuous grafted rubber phase) are at equilibrium. In a practical term, however, the driving force to push the equilibrium towards the direction of inverting the grafted rubber phase into a dispersed phase is the free SAN polymerization that increases the phase volume of the free SAN. Almost all current bulk ABS processes would have to undergo this period in order to obtain rubber particles of bulk morphology (cell morphology), provided that the rubber is sufficiently grafted with the SAN polymer.

To the contrary, the "equilibrium" period for phase inversion is not required and will not appear in the process of the present invention. The dissolved rubber is first given adequate time for grafting to reach a practically maximum level in a grafting reactor. Then, the grafted rubber solution is transferred to a polymerization solution where the existing continuous phase is the monomer solution of free SAN. Under sufficient agitation, rubber particles of "cell" morphology will start to form within the continuous free SAN phase. In other words, the present invention develops a new technology to carry out the grafted rubber phase inversion at a point far beyond the equal phase volume point. Therefore, rubber particle size distribution can be varied and controlled by changing the molecular weights of the grafted SAN in the grafting reactor and by changing the molecular weights of the free SAN in the existing free SAN continuous phase respectively. Therefore, this invention provides great flexibility for rubber particle size control to produce bulk ABS of large particle size distributions for low gloss and bulk ABS of small particle size distributions for high gloss both with good impact properties. Nevertheless, this type of flexibility can hardly be achieved in the conventional low gloss bulk ABS processes without losing impact properties. Thus, the present invention presents one fundamental difference in terms of rubber particle formation control technology compared with the conventional bulk ABS processes.

The present invention involves a continuous mass polymerization process (also referred to as a bulk polymerization process) for making a thermoplastic polymer composition comprising a rubber-modified graft copolymer and a non-grafted rigid polymer (also referred to as a free rigid polymer). The products can have the particle sizes that are corresponding to a low gloss characteristic or can have small particle sizes that are corresponding to a high gloss characteristic. One of the preferred products has a number average particle size of less than 0.3 microns, a monomodal particle size distribution, and particles of "cell" morphology, and exhibits high gloss, high impact resistance properties. The "cell" morphology may also be described as a rubber membrane network of spherical surface with the occluded rigid polymer (SAN) filled in the interior spaces. Furthermore, with the "cell" morphology, the grafted rigid polymer (SAN) is grafted on both sides of the rubber membranes, i.e., exterior or interior of the rubber particle. The process involves feeding a liquid feed comprising vinyl aromatic monomer, unsaturated nitrile monomer and a synthetic butadiene polymer dissolved therein to a grafting reactor to produce graft vinyl aromatic-unsaturated nitrile copolymer grafted on to diene polymer. The amount of the grafted vinyl aromatic-unsaturated nitrile copolymer and average molecular weight can be adjusted and controlled. Also, non-grafted vinyl aromatic-unsaturated nitrile copolymer with a comparable molecular weight to that of the grafted vinyl aromatic-unsaturated nitrile copolymer is formed in the grafting reactor under the same given reaction conditions. The grafting reactor is preferably a plug flow type reactor. Furthermore, the reaction conditions are designed so that phase inversion will not happen at this stage. The grafting reactor produces a first polymerization product which has a level of monomer conversion at this stage which is from 5 to 25 percent by weight based on the total weight of monomer in the feed. The first polymerization product is continuously withdrawn from the grafting reactor and is continuously charged to a phase inversion reactor which is preferably a continuous-stirred tank type reactor wherein phase inversion takes place to yield a phase inverted second polymerization product that is produced having a level of monomer conversion of from 10 to 60 percent by weight based on the total weight of monomer in the original liquid feed. The phase inversion starts to occur when the incoming first polymerization product from the grafting reactor is mixed with the reaction mass in the phase inversion reactor. The second polymerization product is continuously withdrawn from the phase inversion reactor and continuously charged to a finishing reactor which is preferably a boiling type plug flow reactor, wherein a third polymerization product is produced having a level of monomer conversion of from 70 to 95 percent by weight based on the total weight of the monomer in the liquid feed. The third polymerization product is then continuously withdrawn and continuously charged to a devolatilizer to remove volatile materials and obtain the desired thermoplastic composition. The process is able to employ a continuous-stirred tank reactor to control temperature and to control heat transfer during phase inversion, but is also able to achieve high grafting efficiency by using a separate reactor prior to phase inversion to achieve high levels of grafting.

The present invention provides a mass polymerization process that will allow the expected chemistry to take place at the corresponding stages with respect to those subjects mentioned above, leading to products of high performance. This invention also provides a flexible production process for different grades of rubber modified graft copolymer. The materials produced are generally not transparent in nature, but rather are generally opaque. However, the opacity of the material is, in most cases, relatively lower than that of emulsion ABS. The present invention provides a novel bulk process technology for ABS materials of low gloss and high gloss. One of the preferred products of this process can provide high gloss and high impact resistance ABS by producing rubber particles of "cell" morphology with small particle sizes of less than 0.3 microns number average diameter and monomodal size distributions. That is, the present invention offers technology to produce rubber particles with sizes close to those of emulsion particles and with sufficient grafted and occluded vinyl aromatic-unsaturated nitrile (SAN) polymers by a bulk process, leading to high surface gloss and good impact resistance for the bulk vinyl aromatic-unsaturated nitrile-alkadiene (ABS) materials.

Generally but importantly, the present invention provides technology of particle size control within a broad range, as desired, to produce bulk ABS with broad variations in gloss, and with good impact resistance balance.

The present invention involves a continuous mass polymerization process (as illustrated schematically in FIG. 1) for preparing a thermoplastic polymer composition comprising a rubber-modified graft copolymer of a monovinylidene aromatic monomer, an unsaturated nitrile monomer and, optionally either with or free of one or more other comonomers, wherein a liquid feed composition (12) of a monovinylidene aromatic monomer, an unsaturated nitrile monomer and a rubbery butadiene polymer dissolved therein, and optionally a solvent, is charged to a grafting reactor (14) wherein the reactive components of the liquid feed are polymerized to produce a first polymerization product (16) comprising a grafted butadiene polymer of vinyl aromatic-unsaturated nitrile grafted onto butadiene polymer and a non-grafted (free or matrix) vinyl aromatic-unsaturated nitrile copolymer. The grafted butadiene polymer and non-grafted polymer are in solution of unreacted monomer (where the grafted butadiene polymer is the continuous phase), and the level of monomer conversion is from 5 to 25 percent by weight based on the total weight of monomer in the liquid feed composition preferably from 6 to 20 percent by weight thereof, and most preferably from 7 to 15 percent by weight thereof. This grafting reactor product (16) (also referred to as the first polymerization product (16)) is then charged to a phase inversion reactor (18), which is preferably a continuous-stirred tank reactor (18), containing a reaction mass (20) which has undergone phase inversion and which contains a first continuous phase of monovinylidene aromatic monomer, unsaturated nitrile monomer and non-grafted copolymers thereof, and a second dispersed phase comprising discrete particles of graft copolymer having monovinylidene aromatic—unsaturated nitrile copolymer grafted onto butadiene polymer. The product from this phase inversion reactor (18) is the second polymerization product (22) and it has undergone phase inversion and has a monomer conversion level of from 10 to 60 percent by weight based on the total weight of monomer in the liquid feed composition, preferably from 20 to 55 percent by weight thereof, and most preferably from 30 to 45 percent by weight thereof. This second polymerization product (22) from the phase inversion reactor (18) is then charged to a finishing reactor (24), which is preferably a boiling type plug flow reactor (24), wherein polymerization is continued until the product (26) from the finishing reactor (24) has a monomer conversion level of between 70 and 95 percent by weight based on the total monomer in the liquid feed, preferably a conversion level of from 80 to 95 percent by weight thereof and most preferably between 85 and 90 percent by weight thereof. The product (26) from the finishing reactor (24), referred to as the third polymerization product (26), can then be charged to a devolatilizer (28) wherein residual monomer (30) and residual solvents (30) can be removed therefrom to produce a final nonvolatile thermoplastic polymer composition (32). Monomer conversion is defined as weight percent of monomers converted to solids based on the total weight of monomers in the liquid feed composition, and is determined by quantitative vaporization of unreacted monomers, and may be calculated as (weight of total solids minus weight of initial rubber) divided by initial weight of monomers in the feed).

In the grafting reactor (14), the butadiene polymer substrates are grafted not only with desirable amounts of monovinylaromatic-unsaturated nitrile copolymer graft portion but also with desirable molecular weights thereof. By grafting to a point prior to phase inversion in the grafting reactor (14), which is preferably a plug flow reactor (14), the undesirable precipitation or rubber gel formation of ungrafted and low-grafted rubber particles is prevented from occurring. Furthermore, the non-grafted monovinylaromatic-unsaturated nitrile copolymer (SAN) formed in the grafting reactor (14) also has "matching" molecular weights with those of the vinyl aromatic-unsaturated nitrile graft portion of the grafted butadiene polymer. The reaction in the grafting reactor (14) is initiator controlled providing preferential monovinyl aromatic-unsaturated nitrile copolymer (preferably styrene-acrylonitrile copolymer) formation rates for the graft portion of the grafted butadiene polymer compared to the non-grafted monovinyl diene aromatic-unsaturated nitrile (preferably styrene-acrylonitrile) copolymer formation rates. Finally, the overall viscosity of the first polymerization product (16) from the grafting reactor (14) is expected to be as close as possible to the viscosity of the reaction mass (20) in the phase inversion reactor (18), as evidenced by the molecular weight analyses of the grafting reactor products and the molecular weight analyses of the phase inversion reactor products. For making a low gloss product, the desirable weight average molecular weights of the grafting reactor products are in the range of about 150,000 to 250,000 for both grafted and non-grafted vinyl aromatic-unsaturated nitrile copolymer. The desirable weight average molecular weights of the phase inversion reactor products are in the range of, about 100,000 to 200,000 for the non-grafted vinyl aromatic-unsaturated nitrile copolymer. For making a high gloss product, the desirable weight average molecular weights of the grafting reactor products are in the range of about 200,000 to 350,000 for both grafted and non-grafted vinyl aromatic-unsaturated nitrile copolymer. The desirable weight average molecular weights of the phase inversion reactor products are in the range of about 150,000 to 200,000 for the non-grafted vinyl aromatic-unsaturated nitrile copolymer. With the controlled molecular weights as described above, phase inversion of the grafted rubber to form rubber particles of desirable sizes occurs rapidly but not immediately or instantaneously in the phase inversion reactor.

The phase inversion reactor (18), in the form of a continuous stirred tank reactor (18), provides greater uniformity in the reaction conditions under which phase inversion occurs and under which rubber particles are formed than would be achieved by using a plug-flow reactor during phase-inversion. Theoretically, the phase inversion reactor provides an operation condition that causes the incoming grafted rubber continuous phase to undergo phase inversion stage where dispersed rubber particles of "cell" morphology are formed in a continuous non- grafted vinyl aromatic-unsaturated nitrile copolymer phase, which is formed in advance of the rubber phase inversion. The reaction in the grafting reactor (14) is initiator controlled providing preferential vinylidene aromatic unsaturated nitrile copolymer formation rates for the graft vinylidene aromatic-unsaturated nitrile polymer portion of the grafted butadiene polymer compared to the non-grafted styrene-acrylonitrile copolymer formation rates. The reaction mechanism at work in the phase inversion reactor (18) can be that of thermal or chemical initiation which results in the formation of lower molecular weight non-grafted vinyl aromatic-unsaturated nitrile copolymer than was formed in the grafting reactor (14) thereby assisting in viscosity matching between the first polymerization product (16) of the grafting reactor (14) and the reaction mass (20) in the phase inversion reactor (18). Preferably the phase inversion reactor (18) has a polymerization temperature between 120° C. and 150° C. The rubbery synthetic butadiene polymer can be a butadiene homopolymer or a styrene-butadiene block copolymer. For the styrene-butadiene block copolymer, one of the advantages this block copolymer may have is that polystyrene blocks could serve as a "storage" mechanism for initiator thereby permitting a greater reaction rate in the grafting reactor for the grafting of block copolymer than for the butadiene homopolymers. Furthermore, to produce small sized rubber particles for high gloss ABS there is an additional important condition to be acquired in the grafting reactor. That is, a substantially higher weight average molecular weight non-grafted monovinyl aromatic-unsaturated nitrile copolymer for the first polymerization product than that for the second polymerization product has to be formed in the grafting reactor, as set out above.

Exemplary of the vinylidene aromatic monomers that can be employed in the present process are styrene; alpha-alkyl monovinyl monoaromatic compounds, e.g. alpha-methylstyrene, alpha-ethylstyrene, alpha-methylvinyltoluene, etc.; ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halo-substituted styrenes, e.g. 2-chloro-4-methylstyrene, 2,6-dichloro-4-methylstyrene, etc. If so desired, mixtures of such vinylidene aromatic monomers may be employed.

The vinylidene aromatic monomer is used in combination with at least one unsaturated nitrile monomer (also referred to as alkenyl nitrile monomer); e.g., acrylonitrile, methacrylonitrile and ethacrylonitrile.

A liquid feed composition (12) comprising 50 to 90 weight percent monovinylidene aromatic monomer (which is preferably styrene), 8 to 48 weight percent unsaturated nitrile monomer (which is preferably acrylonitrile) having, 2 to 15% by weight of a butadiene polymer dissolved therein based on the entire weight of the liquid feed composition, can be continuously mass polymerized in the present process to produce polyblends of vinylidene aromatic-butadiene-unsaturated nitrile graft copolymers and non-grafted vinyl aromatic-unsaturated nitrile copolymers. Such polyblends can be formed from liquid feed compositions containing monovinylidene aromatic and unsaturated nitrile monomers in weight ratios of about 90:10 to 50:50 respectively, and preferably 80:20 to 70:30 by weight respectively thereof. In addition to the monomers to be polymerized, the formulation can contain initiators where required and other desirable components such as chain transfer agents or molecular weight regulators, stabilizers, etc.

The polymerization may be initiated by thermal monomeric free radicals, however, any free radical Generating initiators may be used in the practice of this invention. Conventional monomer-soluble organic peroxides initiators such as peroxydicarbonates, peroxyesters, diacyl peroxides, monoperoxycarbonate, peroxyketals, and dialkyl peroxides or such as azo-initiators may be used.

The initiator is generally included within the range of 0.001 to 0.5% by weight and preferably on the order of 0.005 to 0.7% by weight of the liquid feed composition, depending primarily upon the monomer present.

As is well known, it is often desirable to incorporate molecular weight regulators such as alpha-methyl styrene dimer, mercaptans, halides and terpenes in relatively small percentages by weight, on the order of 0.001 to 1.0% by weight of the liquid feed composition. From 2 to 20% diluents such as ethylbenzene, toluene, ethylxylene, diethylbenzene or benzene may be contained in the liquid feed composition to control viscosities at high conversions and also provide some molecular weight regulation. In addition, it may be desirable to include relatively small amounts of antioxidants or stabilizers such as the conventional alkylated phenols. Alternatively, these stabilizers may be added during or after polymerization. The liquid feed composition may also contain other additives such as plasticizers, lubricants, colorants and non-reactive preformed polymeric materials which are suitable for and dispersible therein.

The preferred synthetic rubbery diene polymers are butadiene polymers (including mixtures of butadiene polymers) which can be dissolved in the monomers of the feed composition, i.e., any rubbery diene polymer (a rubbery polymer having a second order transition temperature not higher than 0° centigrade, preferably not higher than −20° centigrade, as determined by ASTM Test D-746-52T) of one or more of the conjugated, 1,3 dienes, e.g. butadiene, isoprene, 2-chloro-1,3 butadiene, 1 chloro-1,3-butadiene, piperylene, etc. Such diene polymers include copolymers and block copolymers of conjugated 1,3-dienes with up to any equal amount by weight of one or more copolymerizable monoethylenically unsaturated monomers, such as monovinylidene aromatic monomers (e.g. styrene; an alkylstyrene, such as the o-, m- and p-methyl styrenes, 2,4-dimethylstyrene, the ethylstyrene, p-tert-butystyrene, etc.; an alpha-methylstyrene, alpha-ethylstyrene, alpha-methyl-p-methyl styrene, etc.; vinyl naphthalene, etc.); arylhalo monovinylidene aromatic monomers (e.g. the o-, m- and p-chlorostyrene, 2,4-dibromostyrene, 2-methyl-4-chlorostyrene, etc.); acrylonitrile; methacrylonitrile; alkyl acrylates (e.g. methyl acrylate, butyl acrylate, 2-ethylhexyl acrylate, etc.), the corresponding alkyl methacrylates; acrylamides (e.g. acrylamide, methacrylamide, N-butylacrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and bromides, etc.); and the like. The diene polymers may also be free of any of the above copolymerizable monomers.

Any cross-linking of the diene polymers may present problems in dissolving the rubber in the monomers for the graft polymerization reaction. Therefore, preferably the diene polymers in the feed composition are non-crosslinked, linear polymers.

A preferred group of diene polymers are the stereospecific polybutadiene polymers formed by the polymerization of 1,3-butadiene. These rubbers have a cis-isomer content of from 30 to 98% by weight and a trans-isomer content of from 70 to 2% based on the total weight of the rubber and generally contain at least about 85% of polybutadiene formed by 1,4 addition with no more than about 15% by 1,2 addition. Mooney viscosities of the diene polymers (ML-4, 212° F.) can range from about 20 to 70 with a second order transition temperature of from about −50° C. to −105° C. as determined by ASTM Test D-746-52T. The most preferred diene polymers are styrene-butadiene block copolymers and butadiene homopolymers.

As used herein the term first stage, second stage, and the third stage of the process corresponds to the grafting reactor (14), the phase inversion reactor (18), and the finishing reactor (24) respectively.

In more detail, the first stage of the process is the rubber grafting reactor (14), preferably a plug-flow type reactor (14), wherein a liquid feed composition (12) of butadiene polymer (such as a diblock styrene/butadiene polymer) solution in vinylidene aromatic monomer and unsaturated nitrile monomer, preferably acrylonitrile and styrene monomers, and ethyl benzene diluent containing cross-linking inhibitors and molecular weight regulators (such as alpha-methyl styrene dimer) and initiators (such as peroxyesters) start the polymerization. The reaction can also be thermally initiated. Chain transfer agents such as alkyl/aryl thiols may be used. Other non-thiol type of chain transfer agents may also be used.

The reaction conditions in the grafting reactor (14) are carefully controlled so that diene polymers of the feed composition are given kinetical preference for graft reaction with the styrene and acrylonitrile monomers to form a styrene-acrylonitrile copolymer graft portion Grafted to the diene polymer. At the meantime, the diene polymers are prevented during the reaction in the grafting reactor (14) as much as possible from cross-linking reactions that form rubber gel or any rubber precipitates. On the other hand, the copolymerization of the monomers (styrene and acrylonitrile) of the liquid feed composition (12) to form non-grafted styrene-acrylonitrile copolymer (also referred as free SAN) is not kinetically favored under the given reaction conditions. Therefore, a relatively low percent of reacted monomers actually becomes non-grafted SAN polymer. Thus, overall, high graft efficiency and graft yield can be reached by employing a pre-phase inversion grafting reactor (14), which is preferably a plug flow reactor (14).

At this first stage (14) in the process, the grafted diene polymer is still dissolved in a continuous liquid phase. The non-grafted vinyl aromatic-unsaturated nitrile polymer, however, will appear as small non-grafted vinyl aromatic-unsaturated nitrile polymer domains in the diene rubber solution. Phase inversion and rubber particle formation is controlled not to occur at this first stage (the grafting reactor). The liquid feed composition (12) is continuously fed to the grafting reactor (14) (the first stage), while the first polymerization product (16) which is a grafted diene polymer solution is continuously pumped out of (withdrawn from) the grafting reactor (14) to the phase inversion reactor (18) (the second stage of the process). The temperature of the grafting reactor (14) (the first stage) is preferably from about 80 to 120 degree Celsius, and the agitation (by an agitator (34) driven by a motor (36)) is preferably in the range of 30 to 150 rpm. Residence time in the grafting reactor (14) is preferably from 0.5 to 10 hours.

The present invention provides reaction conditions to preferentially form grafted vinyl aromatic-unsaturated nitrile (grafted SAN polymer portion of the graft copolymer) much more than the non-grafted vinyl aromatic-unsaturated nitrile polymer (non-grafted, SAN polymer) in the grafting reactor. However, as residence time advances in the grafting reactor, increases in the amount of grafted SAN become less and less, eventually, near zero. On the other hand, the amount of non-grafted SAN polymer in the grafting reactor is ever increasing because of an abundance of vinyl aromatic and unsaturated nitrile monomers. However, the reaction to form non-grafted SAN polymer is controlled as it is unfavorable in the grafting reactor (14). There could be a time point at which the total amount of grafted SAN polymer portion equals the total amount of non-grafted SAN polymer and at which the graft efficiency is exactly 50 weight percent and the respective graft yield at that time is expected to reach a level of being practically maximum, and as noted above, increases in the graft yield after that time will be very little. This point is called "cross-point", and the graft efficiency beyond this point will no longer increase but decrease, and the graft yield will stay virtually unchanged from this point on.

Therefore, preferably the polymerization conditions to form grafted SAN polymer portion and non-grafted SAN polymer in the grafting reactor (14) are set to operate very close to the "cross-point". Theoretically, the graft efficiency in this reactor will be close to about 50 weight percent, and the highest graft yield will be reached. The polymerization in the grafting reactor (14) is carried out to a total solids level at which no phase inversion occurs.

The grafting reactor (14) is preferably a plug-flow type reactor (14), and the size of the reactor is such that it has the residence time of preferably between 2 and 3 hours at the desired operating rate. The plug-flow type grafting reactor (14) is operated liquid full with verticle flow from a feed inlet (38) at the bottom (40) of the reactor to an outlet (42) at the top (44) of the grafting reactor (14). There are preferably different temperature control zones in order to control desired temperature profile throughout the grafting reactor (14). Hot oil is preferred heat transfer medium. Preferably radial agitation is provided by at a rate of preferably about 60 rotations per minutes but the agitation rate depends on reactor size.

The liquid feed composition (12) is charged into the bottom (40) of a vertical elongated grafting reactor (14) (a plug-flow type reactor(14)) which is substantially filled with a liquid mass (46) comprising the monomeric vinylidene aromatic monomer, the ethylenically unsaturated nitrile monomer, the synthetic butadiene polymer, a diluent, and an intermediate grafted polymeric material (grafted butadiene polymer) formed therefrom. The liquid mass (46) becomes more viscous as the monomeric material is progressively polymerized. In other words, portions of the liquid mass (46) are continuously moved forward in a plug-flow fashion through the elongated grafting reactor (14) and are subjected to a polymerization temperature and to gentle non-turbulent stirring therein, the liquid mass (46) contains progressively increasing amounts of polymeric solids, and the monomers are progressively polymerized therein. The stirring is sufficient to substantially overcome the tendency of the liquid mass (46) to channel, but is sufficiently non-turbulent so as to minimize back-mixing of the mass within the grafting reactor (14). The viscous, liquid mass (46) in the grafting reactor (14) is a continuous rubber solution throughout the grafting reactor (14) and is not polymerized sufficiently in the grafting reactor (14) to a level causing phase inversion of the rubber solution. The first polymerization product (16) from the grafting reactor (14) has a monomer conversion of between 5 and 25 weight percent based on the total weight of monomer in the liquid feed composition (12), more preferably from 6 to 20 weight percent thereof, and most preferably between 7 and 15 weight percent thereof. Preferably the grafting reactor (14) has a polymerization temperature of less than 120° C., preferably between 90° C. and 110° C.

The first polymerization product (16) is continuously withdrawn from the outlet of the grafting reactor (14), and is continuously charged to the phase inversion reactor (18), which is preferably embodied by a boiling type continuous-stirred tank reactor (18). The phase inversion reactor (18) of the polymerization process contains a reaction mass (20) which has undergone phase inversion thereby forming discrete particles of grafted diene copolymer therein. Also, the phase inversion reactor (18) of the polymerization process contains a continuous phase of monomer, non-grafted rigid copolymer, and optionally solvent. The phase inversion reactor (18) heats the reaction mass (20) sufficiently to cause the reaction mass (20) to boil. The vapors released therefrom are condensed at the top (48) of the phase inversion reactor (48) to form a condensate which then is reintroduced into the reaction mass (20). The reaction mass is preferably sufficiently agitated by a stirrer (50) which is driven by motor (52) to cause substantial back-mixing within the phase inversion reactor, and, more importantly, to assist the formation of rubber particles with desirable sizes. The monomer polymerization level within the phase inversion reactor (18) is adequately high to cause phase inversion therein, and the monomer conversion level of the second polymerization product (22) which is preferably withdrawn via an outlet (56) from the bottom (54) of the phase inversion reactor is between 10 and 60 percent by weight based on the total weight of the monomer in the liquid feed composition (12).

In more detail, the second polymerization product (22) is continuously pumped (by pump (58)) from the phase inversion reactor (18) into the finishing reactor (24), whereby the total solids level of the second polymerization product (22) is preferably in a range of from 20 to 55 wt % based on the entire weight of the second polymerization product (22) and the temperature of the reaction mass (20) is preferably between 120 to 140 degree Celsius.

The reaction mass (20) in the phase inversion reactor (18) is at a higher degree of monomer conversion than the grafting reactor (14) so that monomer depletion from product (16) of the grafting reactor (14) takes place immediately in the phase inversion reactor (18), leading to a decrease of rubber phase volume. Phase inversion of the incoming rubber solution thus starts to occur. Chain transfer agents (and optionally other additives) (60) can be used in the phase inversion reactor to regulate molecular weight of the non-grafted vinyl aromatic-unsaturated nitrile copolymer so that rubber particles of desired sizes will be formed. Furthermore, temperature and total solids level and shear imparted through agitation may also be adjusted at this stage. Residence time in the phase inversion reactor (18) is preferably in the range of about 1 to 10 hours to ensure the completion of phase inversion. The agitation is preferably about 20 to 200 rpm to provide sufficient shear for the grafted diene polymer to disperse.

The viscosity of the reaction mass (20) is relatively constant throughout the phase inversion reactor so that rubber particles obtained are expected to have relatively narrow particle size distribution. Furthermore, the grafted SAN gives the rubber particles good stability in the reaction mass (20) as well as sufficient occluded SAN polymer within the rubber particles. Therefore, the grafting reactor and the phase inversion reactor provide two separate yet consequently dependent steps where rubber grafts and rubber particle size can be adjusted, changed, and controlled respectively and variably. That is, the controllable rubber grafts and the controllable rubber particle sizes are two essential and important features of the present invention. The likely narrow particle size distributions are another important result of the invention.

The second polymerization product (22) is then continuously charged to the finishing reactor (24) (the third stage of the process) which contains a polymeric mass containing grafted copolymer, non-grafted copolymer and monomer. The polymeric mass (62) of the finishing reactor (24) is preferably boiled under the reaction conditions given for this process, and vapors therefrom are condensed to form condensate which is then reintroduced into the polymeric mass (62). The polymeric mass (62) in the finishing reactor is sufficiently agitated (by an agitation device (64) powered by a motor (66)) preferably with some degree of back-mixing, and the third polymerization product (26) from the finishing reactor (24) is withdrawn from the outlet of the reactor thereof. The finishing reactor has a sufficient temperature and residence time to result in the product obtained therefrom having a monomer conversion of from between 70 and 95 percent by weight based on the total weight of monomer in the liquid feed composition (12). The third stage product (26) (the third polymerization product (26)) is withdrawn from the finishing reactor (24) and is charged (by a pump (68)) to a devolatilizer (28) wherein the volatiles (30) (mainly, residual monomer and solvent) from the product of the finishing reactor are evaporated therefrom to produce the final thermoplastic polymer composition (32) of this process.

The finishing reactor (24) provides for completion of non-grafted vinyl aromatic-unsaturated nitrile copolymer polymerizations. The butadiene polymer is cross-linked in the finishing reactor to form crosslinked diene rubber. The molecular weight of the non-grafted SAN is regulated to give sufficient high molecular weight for mechanical properties yet reasonable viscosity for material processing. A package of additives for thermal and oxidative stability, weatherability, and viscosity modification may be added to the reaction mixture at this stage or a later stage. Preferably the finishing reactor has a polymerization temperature of greater than about 150° C.

The cross-linking of the grafted diene polymer to form cross-linked rubber is either thermally initiated or chemically initiated by peroxy free radical initiators to give the rubber particles a certain degree of firmness and integrity. It should be pointed out that during the devolatilization, an additional degree of cross-linking will be acquired by the rubber particles. Undesirable rubber cross-linking levels could occur. Therefore, in the finishing reactor, the level of cross-linking should be controlled such that the resulting rubber particles will have only an adequate degree of cross-linking and will give some room for the additional cross-linking in the devolatilization stage. In any case, over cross-linking of the rubber particles will bring detrimental effects to bulk ABS products. Higher temperatures (about 150 to 180 degree Celsius) in the finishing reactor are applied to reach a total monomer conversion level of about 70 to 95 wt % preferably 80 to 95 weight percent based on the entire weight of the liquid feed composition. Preferably residence time in the finishing reactor is about 2 to 10 hours, and the agitation preferably is about 5 to 50 rpm.

For practice of the invention, the feed solution is preferably prepared from vinyl aromatic monomers, ethylenically unsaturated nitriles, synthetic diene polymer or copolymers such as block copolymers of conjugated 1,3-dienes, and diluents. To prevent rubber cross-linking reaction from taking place before phase inversion, rubber cross-linking inhibitors may also added to the liquid feed composition.

The thermal stability additives which may be used include antioxidants such as octadecyl 3-(3,5-di-t-butyl-4-hydroxyphenyl) propionate or 2,6-di-t-butyl-4-methylphenol and the like. Flow promoters such as EBS wax (N,N'-ethylene bis(stearamide)) and the like may be present in the liquid feed composition. Diluents such as ethylbenzene may be present in the liquid feed composition at levels up to 50 percent by weight based on the total weight of the feed composition, preferably from 5 to 30 percent by weight thereof, and more preferably from 15 to 25 percent by weight thereof.

EXAMPLES

Example 1. The importance of using a grafting reactor.

This example outlines the importance of using a grafting reactor prior to phase inversion in a CSTR. Experimental work for this process has been performed on a bench-scale (2 lbs/hr throughput) as well as a pilot scale (125 lbs/hr) using a reaction system as described above. Reaction conditions and product mechanical properties are given in the following tables. Intermediate reactor samples and the finished ABS pellets are characterized by different analytical methods, such as optical microscopy, transmission electron microscopy (TEM), phase separation, ozonolysis, molecular weight by GPC (gel permeation chromatography), FT-IR, etc.

The analytical results show that graft yield can be adjusted and controlled to achieve high grafting levels in the grafting reactor. With the high level of grafting, rubber particle stability is then achieved by forming a phase-inverted mass (which is essentially an oil-in-oil stable emulsion) with particle size being controlled in the phase inversion reactor. The presence of the grafting reactor leads to good mechanical (impact) properties of the finished ABS product. Without grafting the rubber mixture before the phase inversion reactor, the mechanical properties of the finished ABS are poor.

TABLE I

| Feed Compositions | |
|---|---|
| 12 | pbw SBR rubber |
| 66.0 | pbw Styrene |
| 22.0 | pbw Acrylonitrile |
| 20 | pbw Ethylbenzene (as diluent) | pbw: parts by weight

TABLE 2

Reaction Temperatures and Conversion Levels

|  | 1st Rxr Exit | | 2nd Rxr | | 3rd Rxr | |
| --- | --- | --- | --- | --- | --- | --- |
|  | Temp °C. | TS % | Temp °C. | TS % | Temp °C. | TS % |
| With grafting Rxr | 102.2 | 15.3 | 119.4 | 38.1 | 164.4 | 70 |
| Without grafting Rxr |  |  | 122.7 | 42.5 | 165 | 71 |

TS %: percent total solids by weight
Rxr is an abbreviation for reactor

TABLE 3

Reactor Grafting and Mechanical Properties of Finished ABS

|  | Grafting Rxr Yield % | Melt Viscosity | Izod Impact | Falling Dart Impact |
| --- | --- | --- | --- | --- |
| With Grafting Rxr | 33% | 2038 | 4.0 | 29 |
| Without Grafting Rxr | 0% | 2054 | 1.7 | 6 |

Example 2

Example 2 demonstrates the flexibility of the process, e.g. the ease of preparing a Bulk ABS with an average particle size of <0.3 microns (high gloss), or a Bulk ABS with low gloss.

It has been shown that gloss in ABS is related to particle size. Gloss tends to decrease with increasing particle size. The process as described is flexible enough to produce both high and low gloss products with the same ABS composition. This is achieved by independently controlling the grafting reactor and phase inversion reactor conditions in such a way as to adjust the molecular weight of the polymerizing SAN copolymer to different levels at different stages.

The feed formulation for the production of high gloss bulk acrylonitrile-butadiene-styrene graft copolymer was as follows: 12.5 pbw (parts by weight) SBR rubber, 21.9 pbw Acrylonitrile, 65.6 pbw Styrene, 20 pbw Ethylbenzene (as a diluent), and 0.02 pbw of a peroxy initiator.

TABLE 4

Reaction Conditions for High Gloss Bulk ABS

|  | Grafting Reactor | | | Phase Inversion reactor | Finishing reactor |
| --- | --- | --- | --- | --- | --- |
|  | Top | Middle | Bottom |  |  |
| Temp °C. | 109.4 | 77.2 | 65 | 111.8 | 161.7 |
| Agitation, rpm | 60 | 60 | 60 | 30 | 10 |
| Total Solids % | 25 |  |  | 38 |  |

The mixture at the outlet of the grafting reactor represents the reaction material of which the rubber phase is still the continuous phase and of which the free-SAN is the dispersed phase. The rubber substrate at this point has been grafted with SAN, but the phase inversion (to form rubber particles) does not occur until the mixture is introduced to the phase inversion reactor.

TABLE 5

Outlet of Grafting Reactor Molecular Weights

|  | "High Gloss" ABS | "Low Gloss" ABS |
| --- | --- | --- |
| Mw, Graft | 306,000 | 181,000 |
| Mw, Rigid | 336,000 | 239,000 |

The molecular weight of the SAN produced in the grafting reactor during the production of "low gloss" ABS can be adjusted by the addition of a suitable chain transfer agent (e.g. alpha-methylstyrene dimer @ 0.20 pbw based upon the feed formulation).

Because the rubber is a diblock butadiene-styrene copolymer, the grafted SAN molecular weight (both number average and weight average molecular weight, i.e. Mn, and Mw) are averaged down by the styrene block of the rubber, particularly for the Mn value. However, the free-SAN molecular weights are not averaged down and are very close to those of the grafted SAN.

TABLE 6

Gloss, Impact, and Rubber Particle Size Data for High Gloss ABS

| Gloss*, % 60 Degree | Impact strength** Izod | Falling Dart | Rubber particle size***, Average |
| --- | --- | --- | --- |
| 93.00 | 4.80 | 30 | 0.2338 |

*The specular gloss data were obtained on injection molded specimens.
**The units for Izod impact are ft-lbs/in and for Falling Dart are ft-lbs
***The average rubber particle size was measured directly from a TEM photomicrograph using a computer program for statistics calculations. The rubber particle size (diameter) is presented as number average (diameter) particle size in micron.

We claim:

1. A continuous mass polymerization method for making a thermoplastic composition comprising a rubber modified graft copolymer and non-grafted rigid polymer, said method comprising:

(a) feeding a liquid feed composition into a grafting reactor, said grafting reactor being a first plug-flow reactor and said liquid feed composition comprising (i) at least one polymerizable vinylidene aromatic monomer and, (ii) at least one polymerizable unsaturated nitrile monomer and (iii) a rubbery synthetic butadiene polymer dissolved in said monomers;

(b) reacting said liquid feed composition to a point prior to phase inversion in said grafting reactor to produce a first polymerization product having a monomer conversion of between 5 and 25 percent by weight based on the total weight of monomer in the liquid feed composition;

(c) continuously withdrawing the first polymerization product from the grafting reactor;

(d) continuously charging the first polymerization product to a phase inversion reactor, said phase inversion reactor being a stirred tank reactor;

(e) inverting the rubber continuous phase of the first polymerization product into a dispersed phase in the phase inversion reactor and reacting the first polymerization product in the phase inversion reactor to a point after phase inversion to produce a second polymerization products having a monomer conversion of between 10 and 60 percent by weight based on the total weight of monomer in the liquid feed compositions;

(f) continuously withdrawing the second polymerization product from the phase inversion reactor;

(g) continuously charging the second polymerization product into the finishing reactor, said finishing reactor being a second plug-flow reactor;

(h) reacting the second polymerization product in the finishing reactor to produce a third polymerization product having a monomer conversion of between 70 and 95 percent based on the total weight of monomer in the liquid feed;

(i) continuously withdrawing the third polymerization product from the finishing reactor; and (j) charging the third polymerization reactor product to a devolatilizer to remove residual volatiles therefrom to produce the thermoplastic composition.

2. The method of claim 1 wherein said liquid feed comprises styrene and acrylonitrile monomers.

3. The method of claim 2 wherein said synthetic butadiene polymer is selected from the group consisting of styrene-butadiene block copolymers and butadiene homopolymers.

4. The method of claim 1 wherein said butadiene polymer undergoes cross-linking in said finishing reactor.

5. A continuous mass polymerization method for making a thermoplastic polymer composition comprising an acrylonitrile-butadiene-styrene graft copolymer and a non-grafted, styrene-acrylonitrile copolymer, said method comprising:

(a) feeding a liquid feed composition comprising styrene, acrylonitrile, and a synthetic butadiene polymer into an inlet of grafting reactor, wherein said grafting reactor is substantially filled with a grafted rubber continuous phase liquid mass comprising styrene monomer, acrylonitrile monomer, synthetic butadiene polymer, and an intermediate polymeric material which comprises products of addition reactions between said styrene, acrylonitrile and butadiene polymer, said liquid mass being subjected to a polymerization temperature wherein the liquid mass contains progressively increasing amounts of intermediate polymeric material as the liquid mass moves through the grafting reactor from the inlet to an outlet of the grafting reactor, said liquid mass being sufficiently polymerized to provide a first polymerization product having a rubber continuous phase product having a level of monomer conversion of between 5 and 25 percent by weight based on the total amount of monomer in the liquid feed composition, said level of monomer conversion in the grafting reactor being insufficient to cause phase inversion of the liquid mass;

(b) continuously withdrawing said first polymerization product from said outlet of the grafting reactor;

(c) continuously charging the first polymerization product into a continuous-stirred tank reactor containing a reaction mass which has undergone phase inversion, said reaction mass comprising a continuous phase comprising styrene, acrylonitrile and styrene-acrylonitrile copolymer, and a dispersed phase comprising grafted diene polymer in the form of a plurality of discrete particles, heating said reaction mass sufficiently to cause polymerization of the reaction mass to form a second polymerization product and to cause the reaction mass to boil and thereby generate vapors, condensing said vapors to form a condensate, reintroducing the condensate into the reaction mass;

(d) continuously withdrawing a second polymerization product from said continuous-stirred tank reactor, said second polymerization product having a level of monomer conversion of between 10 and 60 percent by weight based on the total weight of monomer in the liquid feed composition;

(e) continuously charging the second polymerization product into a boiling plug flow reactor containing a polymeric mass, heating the boiling plug flow reactor sufficient, to cause polymerization of the polymeric mass to form a third polymerization product and to cause boiling of the polymeric mass to generate vapors, condensing the vapors from the polymeric mass to form condensate, reintroducing said condensate into said polymeric mass;

(f) continuously withdrawing the third polymerization product from said boiling plug flow reactor wherein said third polymerization product has a monomer conversion of between 70 and 95 percent by weight based on the total weight of monomer in the liquid feed; and (g) charging the third polymerization product to devolatilizer to remove residual volatiles therefrom and produce said thermoplastic polymer composition.

6. The method of claim 5 wherein said grafting reactor has a polymerization temperature of less than 120° C., said continuous-stirred tank reactor has a polymerization temperature of between 120° C. and 150° C., and said boiling plug flow reactor has a polymerization temperature of greater than 150° C.

7. The method of claim 5 wherein said liquid feed composition consists essentially of styrene monomer, acrylonitrile monomer, synthetic rubbery polybutadiene rubber, initiator and chain transfer agent.

8. The method of claim 5 wherein said polybutadiene copolymer is a styrene-butadiene copolymer or a butadiene homopolymer.

9. The method of claim 8 wherein said styrene-butadiene copolymer comprises polystyrene blocks.

10. The method of claim 5 wherein said method consists essentially of said steps (a), (b), (c), (d), (e), (f) and (g).

11. The method of claim 5 wherein said method consists of said steps (a), (b), (c), (d), (e), (f) and (g).

12. In the process of claim 11 wherein the rubbery synthetic butadiene polymer is crosslinked in the finishing reactor.

13. A continuous mass polymerization method for making a thermoplastic polymer composition comprising a rubber modified graft copolymer and a non-grafted rigid polymer, said method comprising the steps of:

(a) feeding a liquid feed composition comprising (i) at least one polymerizable monomeric vinylidene aromatic monomer, (ii) at least one ethylenically unsaturated nitrile monomer and (iii) a synthetic butadiene polymer, into an inlet of a plug flow grafting reactor, polymerizing the liquid feed to produce a first polymerization product having a monomer conversion of between 5 to 25 percent by weight based on the total amount of monomer in the liquid feed;

(b) continuously withdrawing said first reaction product from the grafting reactor;

(c) continuously charging said first reaction product into a continuous stirred tank reactor containing a reaction mass which has undergone phase inversion having a continuous phase comprising monomer and non-grafted polymer and another phase comprising grafted diene polymer;

(d) heating the reaction mass in said continuous stirred tank reactor sufficiently to cause the reaction mass to boil, and condensing vapors boiled therefrom and introducing the condensate into the reaction mass, said reaction mass undergoing sufficient polymerization to produce a phase inverted second polymerization product which has a level of monomer conversion of between 10 weight percent and 60 weight percent based on the total weight of monomer in the liquid feed composition;

(e) continuously withdrawing the second polymerization product from the continuous stirred tank reactor;

(f) continuously charging the second polymerization product to a boiling type plug flow reactor where the polymeric mass is heated to a temperature sufficient to boil and to cause the polymeric mass to polymerize sufficiently to produce a third polymerization product, the vapors from the boiling polymeric mass are condensed and reintroduced to the polymeric mass, the third polymerization product having a level of monomer conversion of between 70 weight percent and 95 weight percent based on the total weight of monomer in the liquid feed composition;

(g) charging the third polymerization product into a devolatilizer wherein residual monomer and any other residual volatiles are removed thereby forming the desired thermoplastic polymer composition.

14. A continuous process for making a high gloss bulk rubber modified graft copolymer composition, comprising, a) reacting a continuous organic phase of vinyl aromatic monomer, unsaturated nitrile monomer and a rubbery diene polymer dissolved in said monomers to a point prior to phase inversion in a plug flow reactor to produce a first reaction product having a solids content of between 5 and 25 percent by weight based on the total weight of said organic phase, b) charging said first reaction product to a continuous stirred tank reactor containing a phase inverted reaction mass and inverting rubber continuous phase of the first reaction product into a dispersed phase and reacting said first reaction product therein to produce a second reaction product having a solids content of between 10 and 60 weight percent based on the total weight of said second reaction product c) reacting said second reaction product in a plug flow reactor to yield a third reaction product having a solids level of from 70 to 95 weight percent, d) devolatilizing said third reaction product to yield a said composition wherein said composition comprises a graft copolymer comprising a diene rubber substrate and a vinyl aromatic/unsaturated nitrile polymer grafted to said substrate, said rubber substrate having a number average particle size diameter of not more than 0.3 microns, said rubber substrate having a cell morphology defined as a rubber membrane network of spherical surface with occluded vinyl aromatic/unsaturated nitrile copolymer inside the rubber substrate.

15. The process of claim 14 wherein said composition has a gloss of greater than 90% at 60 degrees as measured by a Gardner gloss meter.

16. The process of claim 14 wherein said composition has a Dynatup energy at maximum of at least 30 foot pounds.

17. The process of claim 14 wherein said composition has a Dynatup total energy of at least 30 foot pounds.

18. The process of claim 14 wherein said rubber substrate number average particle size diameter is not more than 0.3 microns.

19. The process of claim 14 wherein said rubber substrate number average particle size diameter is not more than 0.25 microns.

20. The process of claim 14 wherein said composition has a diene polymer of the rubber substrate at level of from 5 percent by weight to 20 percent by weight based on the total weight of the composition.

* * * * *